United States Patent [19]

Wang et al.

[11] 4,451,612

[45] May 29, 1984

[54] CONTINUOUS PROCESS FOR THE PREPARATION OF RUBBER MODIFIED POLYMERS

[75] Inventors: Jerry C. Wang, Lodi; Michael R. Stepanian, Ridgewood, both of N.J.

[73] Assignee: Mobil Oil Corporation, New York, N.Y.

[21] Appl. No.: 426,402

[22] Filed: Sep. 29, 1982

Related U.S. Application Data

[63] Continuation of Ser. No. 189,424, Sep. 22, 1980, abandoned.

[51] Int. Cl.³ .......................................... C08F 279/02
[52] U.S. Cl. ........................................ 525/53; 525/316
[58] Field of Search ................ 525/53, 316, 243; 528/501; 264/176 R

[56] References Cited

U.S. PATENT DOCUMENTS

| | | | |
|---|---|---|---|
| 2,727,884 | 12/1955 | McDonald et al. | 260/93.5 |
| 3,123,655 | 3/1964 | Otting | 264/176 R |
| 3,243,481 | 3/1966 | Ruffing et al. | 260/880 |
| 3,485,782 | 12/1969 | Nagle | 264/176 R |
| 3,658,946 | 4/1972 | Bronstert | 525/316 |
| 3,903,202 | 9/1975 | Carter | 525/316 |
| 3,945,976 | 3/1976 | McCurdy | 525/316 |
| 3,954,910 | 5/1976 | Kropp | 528/501 |

Primary Examiner—Paul R. Michl
Attorney, Agent, or Firm—A. J. McKillop; M. G. Gilman; Edward F. Kenehan, Jr.

[57] ABSTRACT

The present invention relates to a method for the production of high impact polystyrene utilizing a continuous process in place of the previously known batch polymerization techniques. The continuous process includes the steps of rubber solution preparation; prepolymerization; second stage polymerization; devolatilization and separation extrusion and pelletizing.

8 Claims, 1 Drawing Figure

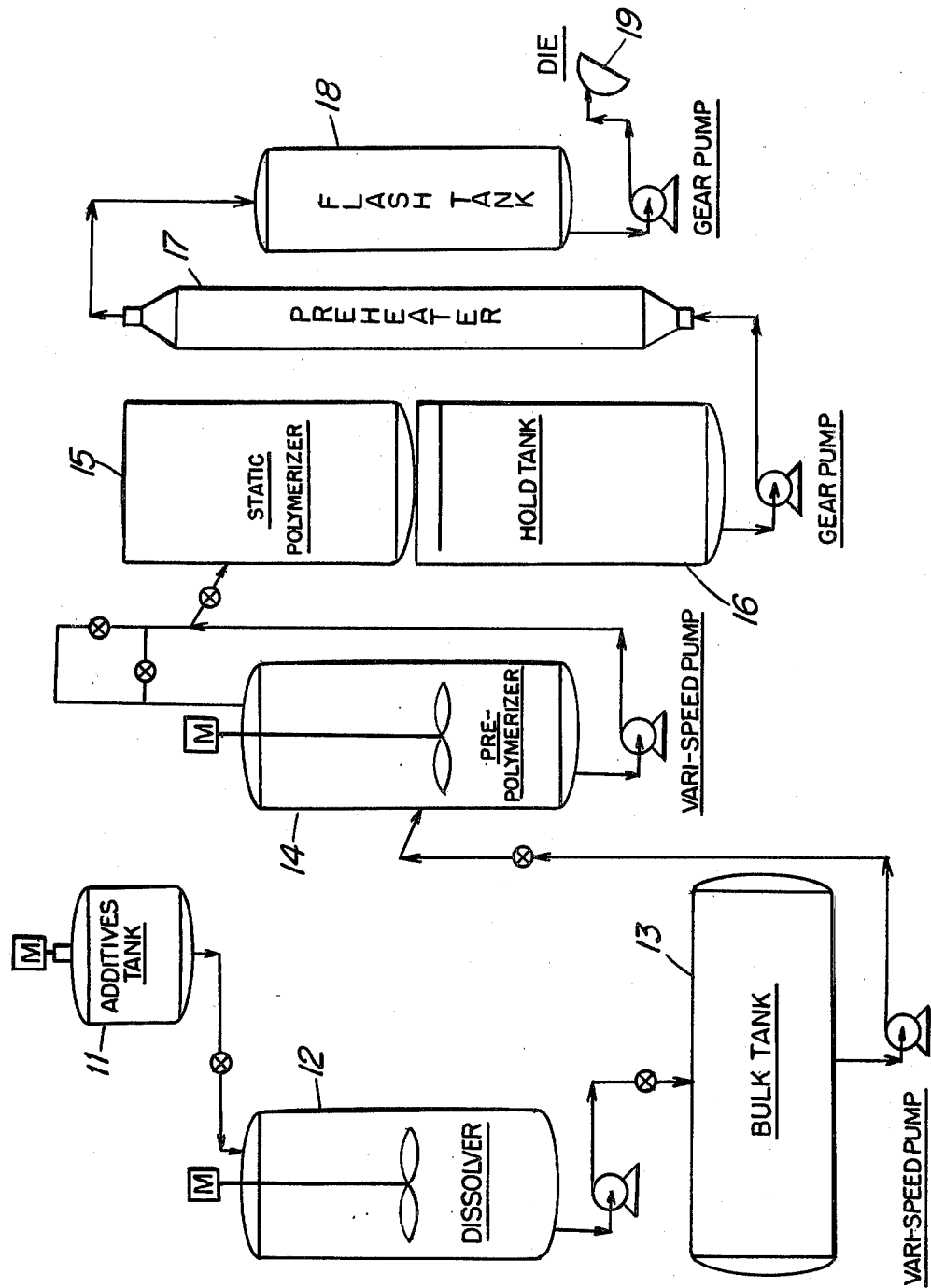

CONTINUOUS PROCESS FOR THE PREPARATION OF RUBBER MODIFIED POLYMERS

This is a continuation of application Ser. No. 189,424 filed Sept. 22, 1980 and now abandoned.

BACKGROUND OF THE INVENTION

1. Field of the Invention

The present invention is directed to an improved process for producing impact grade polystyrenes.

2. Description of the Prior Art

As is well known to those familiar with the art, impact grade polystyrene is usually produced by bulk pre-polymerization of a styrene rubber solution up to about 40% conversion. One of the inherent shortcomings of the batch-wise polymerization of impact polystyrene is the downtime of reaction vessels which are employed in the production line. At any given point in the process, there is a certain amount of time when a particular vessel is empty rather than being employed in the polymerization process.

SUMMARY OF THE INVENTION

The present invention provides a process for producing an improved impact grade polystyrene whereby increased production rates are realized and additionally improved process economics, improved product uniformity as well as quality are made possible. This is achieved utilizing a continuous process for manufacturing the impact polystyrene as opposed to the conventional batch process referred to hereinabove.

BRIEF DESCRIPTION OF DRAWING

FIG. 1 is a schematic illustration of a flow system which may be employed in the continuous polymerization process of the present invention.

DESCRIPTION OF SPECIFIC EMBODIMENTS

Process conditions, equipment and control techniques have now been developed for a rubber modified polystyrene polymer synthesis process in which all the basic reaction steps and polymer finishing steps, including preheating, devolatilizing, extrusion and pelletizing are carried out in a continuous fashion. The process of the present invention comprises the following basic process steps:

(a) rubber solution preparation;
(b) pre-polymerization;
(c) static polymerization;
(d) and polymer heating, volatile separation, and pelletizing.

For purposes of the present invention the rubber solution preparation step may be carried out batch-wise in which case a solution holding tank is used to provide a constant feed stream of the styrene-rubber solution to the latter process train. The rubber solution is prepared by dissolving a rubber in the styrene monomer, or mix of vinyl aromatic compounds, and preferably with a diluent of high boiling point. Additives such as antioxidants, lubricants, dyes and chain modifiers may be added to the dissolver solution or metered directly into the prepolymerizer. The rubber solution is fed as a continuous stream into the 1st prepolymerizer which is kept at a constant operating level, provided with high shear agitation, and heating-cooling means to maintain the vessel at the desired reaction temperature of from 100° C. and preferably from about 110° C. to about 140° C. The total solids of the reactor mix or the degree of polymer conversion is kept approximately constant by maintaining a constant retention time or solution feed rate. With adequate agitation and retention time, and a conversion of 10%–40% of the monomers, formation of desirable grafted rubber particles, which are important for good product properties, are obtained. A prepolymer product stream is withdrawn continuously from the prepolymerizer and fed to the top of a 2nd state static reactor in which the reactor level is also kept constant by balancing the feed and the product discharge. No agitation is needed in the 2nd stage reactor. The 2nd stage reactor may have one or more temperature reaction zones, each being installed with multiple tube bundles for uniform temperature control. By controlling the residence time, rection temperature and percent of conversion, the polymer mass is kept in a state of free flow by gravitational force and moves downward in essentially plug flow manner, i.e., uniform movement in one direction in the absence of end to end or back mixing, with increasing polymer conversion in the forward direction. The reacting mass in the 2nd stage reactor is kept in the temperature range of 110° C. to 230° C. and preferably from about 130° C. to about 190° C. Where multiple zones are used, the temperature in these zones can be kept in an increasing manner in the direction of the product flow. The product stream withdrawn from the 2nd stage reactor may optionally be fed continuously to a 3rd stage reactor, when a single zone 2nd stage reactor is used. In the 3rd stage reactor, the polymer mass is kept at a relatively short residence time at a temperature in the range of 130° C. to 250° C. for further conversion and property modifications. Means for heating is provided but agitation is not necessary. The polymer is then pumped through a heat exchanger into a flash tank in which vacuum is applied to remove the residual monomer and diluent. The devolatilized polymer is then extruded and pelletized.

The improved operation of this invention is applied to the two stage polymerization of a solution of a rubber in a styrene reactant. The rubber used in making the thermoplastic compositions can be either a natural rubber such as pale crepe, or preferably a synthetic rubber, such as polybutadiene or an SBR synthetic rubber, [e.g., low cis (diene) or high cis (taktene)], a copolymer of butadiene and styrene which is usually derived from butadiene and styrene in proportions lying between 50:50 and 95:5 by weight. Elastomers produced from monovinyl-aromatic compounds other than styrene or dienes other than butadiene are also suitable providing, of course, that such rubbers are sufficiently monomer soluble, i.e., the rubbers used as starting materials should be substantially gel-free so as to dissolve in the monovinyl-aromatic compound.

The amount of rubber used is generally between about 2 and about 15 percent by weight of the styrene reactant. The optimum depends on the type of rubber used and on the properties required in the final high impact polymer.

The styrene reactant is a monovinyl benzene compound or a derivative thereof. The compositions contemplated include styrene and its polymerizable derivatives, such as the lower alkyl-substituted styrenes and chlorine-substituted derivatives. Typical styrene reactants are styrene, α-methylstyrene, p-methylstyrene, and m-chlorostyrene. Minor amounts of comonomers such as acrylonitrile, methyl methacrylate and the like may also be employed. Styrene is preferred in the prepolymerization stage. The desired amount of rubber is dissolved in the styrene reactant. Then, the resultant solution is subjected to bulk polymerization.

As shown in FIG. 1 the continuous polymerization process of the present invention comprises a dissolver tank in which the monomer, rubber and diluents are added. An additives tank 11 is employed to combine additives such as a lubricant mineral oil, antioxidants, and chain terminators or modifiers and the like. From additives tank 11 the mixture is passed to dissolver tank 12. The primary purpose of the dissolver tank 12 is to dissolve the rubber in the styrene monomer along with a diluent such as ethylbenzene and other additives described hereinabove. The dissolving process takes approximately 3 to 4 hours depending upon the rubber concentration. The rubber solution from the dissolver tank 12 is subsequently pumped into holding bulk tank 13 which continuously supplies polymerizable solution to the down stream prepolymerizer tank 14 and static polymerizer tank 15. Prepolymerizer 14, the first reaction vessel, consists of an agitator and four (4) banks of coils for heat transfer purposes. Polymerization of the rubber-styrene solution commences under very strict agitation and continues to approximately 30% to 45% conversion in this vessel. When a temperature of approximately 118° C. is reached in the prepolymerizer a significant exothermic polymerization reaction is apparent. After approximately 3 to 3.5 hours at 128° C. the contents of the prepolymerizer are continuously transferred to the static polymerizer to complete the polymerization process. Static polymerizer tank 15 employed in the second stage polymerization of the prepolymer consists essentially of a large shell and tube heat exchanger. Heat transfer oil flows on the inside of the tube while the polymer is in the void space outside the tube and within the confines of the steel shell. Second stage polymerization continues at a higher temperature than the prepolymerizer and up to about 160° C. The contents of static polymerizer tank 15 are subsequently continuously passed into hold tank 16 which can act as a third stage polymerizer or a surge tank for the remainder of the manufacturing operation. The polymer solution is subsequently pumped into a preheater 17 which is essentially a single pass heat exchanger which raises the temperature of the polymer mix up to about 220°-230° C. where devolatilization commences in preparation for final devolatilization in flash tank 18. Flash tank 18 may be a jacketed vessel wherein residual monomer and ethylbenzene are stripped of the polymer mix. It is maintained at 220° C. under a vacuum of 10-50 mm. of mercury absolute. The polymer melt exiting from flash tank 14 is essentially pure impact polystyrene. The polymer, via a gear pump mounted at the base of flash tank 18, is pumped through die head 19 through which strands of the polymer are extruded and quenched in a water bath, not shown, and subsequently pelletized, classified, and transferred to various packing modes. The solvent and unrected styrene that are stripped from the polymer mix in flash tank 18 may be recondensed and collected in a surge tank, not shown, for re-use.

In the following example conditions for a typical continuous polymerization operation in accordance with the present invention are set forth. This example is for purposes of illustration only and should not be considered in a limitative sense.

EXAMPLE 1

A stream of rubber solution consisting of:

| | |
|---|---|
| Styrene | 90.684 parts |
| Diene Rubber | 8.0 |
| Mineral Oil | 1.0 |
| *BHT | 0.15 |
| **TNPP | 0.15 |
| ***t-ddm | 0.016 |
| | 100.000 parts |
| Ethyl Benzene | 10.0 parts |

*Butylated hydroxy toluene antioxidant
**Tris-nonylphenyl phosphite antioxidant
***Tertiary Dodecyl mercaptan is pumped at the rate of 24 gals/hr (181.15 lbs/hr) from the solution hold tank into a first stage prepolymerizer which was kept at a liquid level of 117 gallons. The prepolymerizer was a jacketed vessel provided with internal cooling coils, a twin turbine agitator and a level control device. The prepolymerizer was kept at 260° F. with agitation at 300 RPM. The reacting mass had a total solids content of 34% by weight (including rubber). A product stream equal to the amount of feed was withdrawn continuously from a bottom discharge port of the prepolymerizer and fed to the upper level of the 2nd stage reactor with the aid of a variable speed gear pump. The second stage reactor was a vertical tower constructed of steel and installed with multiple heat-exchanger tubes throughout the entire operating volume. The reacting mass in the reactor was kept at about 119 gals. level and the reactor tube bundles were circulated with oil having a temperature of 293° F. at the reactor inlet header. The product flow of the 2nd stage reactor was pumped through the tube and shell exchanger, heated to 400° F., then entered into the volatile separator, in which a vacuum of −28″ Hg was maintained. Devolatilized polymer was extruded through the die head into strands which were subsequently pelletized.

Typical product properties produced were:

| | |
|---|---|
| M.F. (5000 g. 190° C.) | 2.5 |
| Izod ft. lb./in notch | 2.3 |
| Tensile Yield, psi | 4530 |
| Tensile Fail, psi | 3970 |
| Elongation | 17% |
| Rockwell "L" | 72 |
| Vicat Point, °C. | 100 |

The calculated production rate was 158.2 lbs. of polymer per hour (excluding solvent, 96% conversion).

A typical prior art batch product made with the same dissolver solution has the following properties:

| | |
|---|---|
| M.F. (5000 gm, 190° C.) | 1.7 |
| Izod ft. lbs./in notch | 2.2 |
| Tensile Yield, psi | 3660 |
| Tensile Fail, psi | 4000 |
| Elongation | 32% |
| Rockwell "L" | 56 |
| Vicat Point, °C. | 10 |

A continuous polymerization technique of the present invention results in a considerable amount of energy savings and conservation in that the requisite heating and cooling stages which are requisite in batch polymerization techniques are eliminated. Additionally, product uniformity of resin produced in a continuous process is far superior to that which is obtained in a batch step process. Furthermore, the absence of macrogels in the resin resulting from the continuous process in comparison to resin produced in accordance with a batch process results in extruded sheets formed from the continuous process resin which have far superior surface properties as contrasted with sheets formed from resin produced in a batch process. Finally, the general overall improvement and strength and mechanical properties of the resin output from a continuous process make such a continuous process far superior than the prior art batch techniques for producing high impact polystyrene resin.

The present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A continuous process for the manufacture of high impact polystyrene resin by bulk polymerization which process comprises:
    (a) preparing a solution of styrene monomer and rubber;
    (b) Prepolymerizing said solution with controlled high shear agitation;
    (c) passing said solution to at least one static final stage polymerizer wherein the polymer mass is kept in a state of free flow by gravitational force without agitation and moves downward in essentially plug flow manner, whereby the polymer mass moves uniformly in one direction in the absence of end to end or back mixing, with increasing polymer conversion in the forward direction, wherein said at least one final stage polymerizer consists essentially of at least one shell and tube heat exchanger, said exchanger having a shell in the form of a vertical tower, said shell being installed with multiple heat-exchanger tubes throughout the entire operating volume of said shell, whereby according to said step (c) heat transfer oil flows on the inside of said heat-exchanger tubes, while said solution being subjected to polymerization occupies the void space outside said heat-exchanger tubes and within the confines of said shell;
    (d) passing the product stream from said final stage polymerizer to a preheater;
    (e) passing said preheated product stream from said preheater to a devolatilization chamber wherein unreacted monomer and diluent are flashed off; and
    (f) finally passing the high impact polystyrene polymer through an extrusion die whereupon solidified high impact polystyrene polymer is produced.

2. The process of claim 1, wherein (b) the prepolymerizing is carried out at about 116°–128° C. to a solids content of 30–45% by weight; (c) the temperature of final stage polymerization is up to about 160° C.; (d) preheating is carried out at about 220°–230° C.; and (e) the devolatilization chamber is operated at about 220° C. under a vacuum of 10–50 mm. of mercury absolute.

3. The process of claim 1, wherein the prepolymerizing is carried out at about 116°–128° C. to a solids content of 30–45% by weight.

4. The process of claim 1, wherein the temperature of final stage polymerization is up to about 160° C.

5. The process of claim 1, wherein preheating is carried out at about 220°–230° C.

6. The process of claim 1, wherein the devolatilization chamber is operated at about 220° C. under a vacuum of 10–50 mm. of mercury absolute.

7. The process of claim 1, wherein said solution is passed to no more than one static final stage polymerizer according to said step (c).

8. A continuous process for the manufacture of high impact polystyrene resin by bulk polymerization which process comprises:
    (a) preparing a solution of styrene monomer and rubber;
    (b) prepolymerizing said solution with controlled high shear agitation to a solids content of 30–45% by weight;
    (c) passing said solution to at least one static final stage polymerizer wherein the polymer mass is kept in a state of free flow by gravitational force in the absence of stirring and without agitation and moves downward in essentially plug flow manner, whereby the polymer mass moves uniformly in one direction in the absence of end to end or back mixing, with increasing polymer conversion in the forward direction, wherein said at least one final stage polymerizer consists essentially of at least one shell and tube heat exchanger, said exchanger having a shell in the form of a vertical tower, said shell being installed with multiple heat-exchanger tubes throughout the entire operating volume of said shell, whereby according to said step (c) heat transfer oil flows on the inside of said heat-exchanger tubes, while said solution being subjected to polymerization occupies the void space outside said heat-exchanger tubes and within the confines of said shell;
    (d) passing the product stream from said final stage polymerizer to a preheater;
    (e) passing said preheated product stream from said preheater to a devolatilization chamber wherein unreacted monomer and diluent are flashed off; and
    (f) finally passing the high impact polystyrene polymer through an extrusion die whereupon solidified high impact polystyrene polymer is produced.

* * * * *

UNITED STATES PATENT AND TRADEMARK OFFICE
CERTIFICATE OF CORRECTION

PATENT NO. : 4,451,612

DATED : May 29, 1984

INVENTOR(S) : Jerry C. Wang and Michael R. Stepanian

It is certified that error appears in the above-identified patent and that said Letters Patent is hereby corrected as shown below:

Column 2, line 1, at the beginning of the line between "C." and "and" insert --to 150°C.--.

Signed and Sealed this

Twelfth Day of February 1985

[SEAL]

Attest:

DONALD J. QUIGG

*Attesting Officer*     *Acting Commissioner of Patents and Trademarks*